(12) United States Patent
Mou

(10) Patent No.: US 6,359,591 B1
(45) Date of Patent: Mar. 19, 2002

(54) LOCKING ANTENNA FOR PERSONAL COMPUTER CARD

(75) Inventor: Wei Mou, Port Coquitlam (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 09/694,076

(22) Filed: Oct. 19, 2000

(51) Int. Cl.[7] .............................................. H01Q 1/24
(52) U.S. Cl. ..................... 343/702; 343/906; 343/900
(58) Field of Search ................................ 343/702, 906, 343/900, 901; 455/90; H01Q 1/24

(56) References Cited

U.S. PATENT DOCUMENTS

| | | | |
|---|---|---|---|
| 5,617,106 A | | 4/1997 | Tahmassebpur ............. 343/702 |
| 5,628,055 A | | 5/1997 | Stein ........................... 455/89 |
| 5,644,320 A | * | 7/1997 | Rossi .......................... 343/702 |
| 5,913,174 A | | 6/1999 | Casarez et al. ............. 455/557 |
| 5,945,952 A | * | 8/1999 | Davidson .................... 343/702 |
| 6,166,696 A | * | 12/2000 | Chenoweth et al. ........ 343/702 |
| 6,208,301 B1 | * | 3/2001 | Sandgren et al. ........... 343/702 |
| 6,266,017 B1 | * | 7/2001 | Aldous ........................ 343/702 |

* cited by examiner

*Primary Examiner*—Hoanganh Le
(74) *Attorney, Agent, or Firm*—Burns Doane Swecker & Mathis LLP

(57) ABSTRACT

A device for providing wireless communication is disclosed. The device includes a retractable antenna connected to modem and PC card. The retractable antenna has a locking mechanism for providing a snap lock to maintain the antenna in the extended position during ordinary use and allowing retraction of the antenna by force when not in use. The retractable antenna has an antenna sleeve which receives the antenna and locks the antenna in the extended position. The antenna also has a pivotal connection for pivoting the antenna and a rotatable connection for rotating the antenna in a direction which differs from the direction of rotation. The antenna is rotatable about two axes and is retractable. In the extended position, the antenna is electrically connected with the PC card and can receive and transmit signals.

33 Claims, 5 Drawing Sheets

LOCKING ANTENNA FOR PERSONAL COMPUTER CARD

Typically, a PCMCIA wireless modem card has an antenna which transmits and receives signals. The overall performance of the antenna is a function of the length of the antenna. If the antenna is extended and then rotated or pushed back into the PC card rather than in full extension, the performance of the modem card is compromised.

Accordingly, what is needed is an antenna for use with a PCMCIA card which locks into place when the antenna is fully extended maximizing the receiving and transmitting capability of the modem and allowing the antenna to retract when not in use.

SUMMARY

A retractable antenna device is disclosed that is used with a personal computer to provide wireless communication.

In accordance with one aspect of the present invention, a device for providing wireless communications includes a PC card, a modem within the PC card, a retractable antenna connected to the modem, the retractable antenna having an extended transmitting/receiving position and a retracted position with respect to the PC card, and a locking mechanism for providing a lock to maintain the antenna in the extended position during ordinary use and retraction of the antenna when not in use.

In accordance with another aspect of the present invention, a retractable antenna for a PC card for use in wireless communication includes an antenna sleeve electrically connectable to the PC card, a retractable antenna positioned within the antenna sleeve and slidable within the antenna sleeve from an extended transmitting/receiving position to a retracted storage position, and a locking mechanism provided between the antenna sleeve and the retractable antenna for locking the antenna in the extended transmitting/receiving position to achieve a predetermined transmitting/receiving antenna length.

In one more detailed aspect of the invention, the PCMCIA card will transmit and receive radio signals in the 1850 to 1990 megahertz ranges.

In another detailed aspect of the invention, the retractable antenna has a pivotable connection for pivoting the antenna about a first axis and a rotatable connection for rotating the antenna in direction which differs from the direction of pivot of the pivotal connection.

The foregoing and other advantages of the present invention will become more apparent from following description and accompanying drawings.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION

Figure 1:
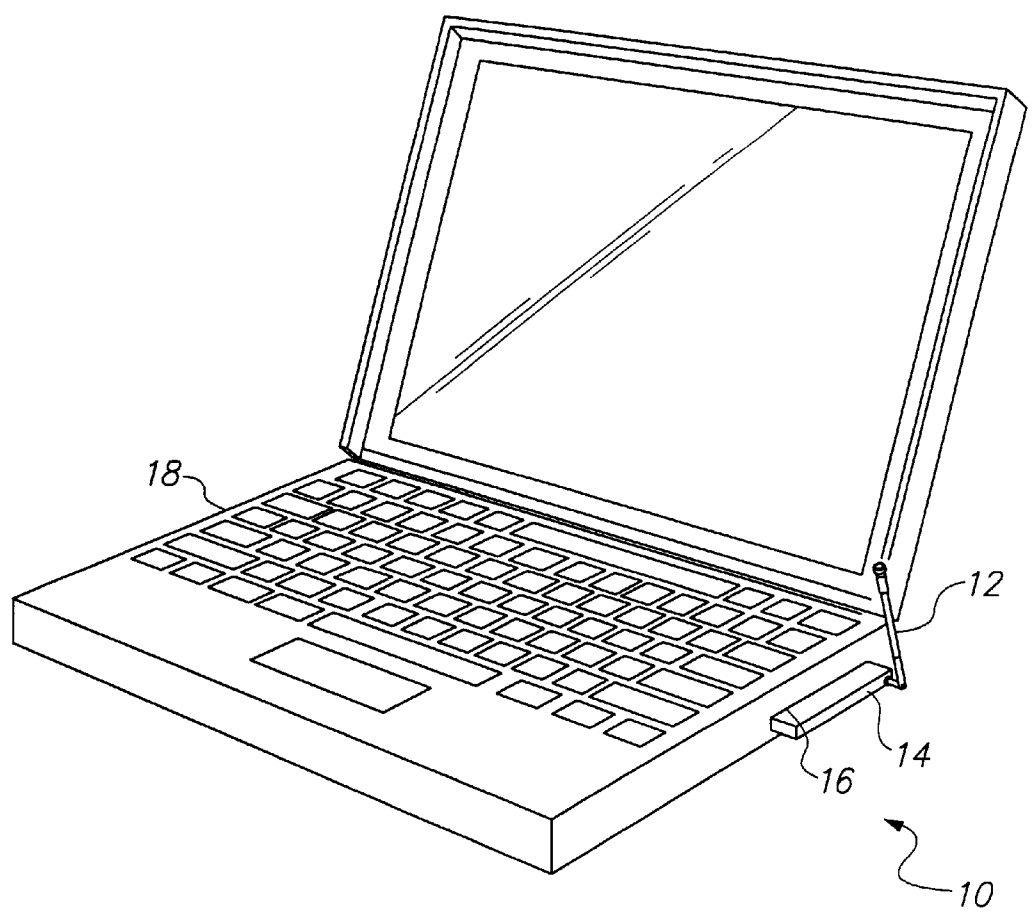
FIG. 1 is a perspective view of an antenna mounted to a PC card which is connected with a personal computer in accordance with one embodiment of the present invention.

FIG. 1 shows one embodiment of a device 10 which provides for wireless communication. The device 10 includes a receive/transmit antenna 12 connected to the base of a PC card 14 which may include a modem or a radio. The PC card 14 plugs into a PCMCIA slot 16 of a personal computer 18 and enables a user to communicate with a wireless system using an air interface. Preferably, the computer card 14 plugs into a PCMCIA type II slot, however, the card may also be designed to be received in other slots.

Figure 2:
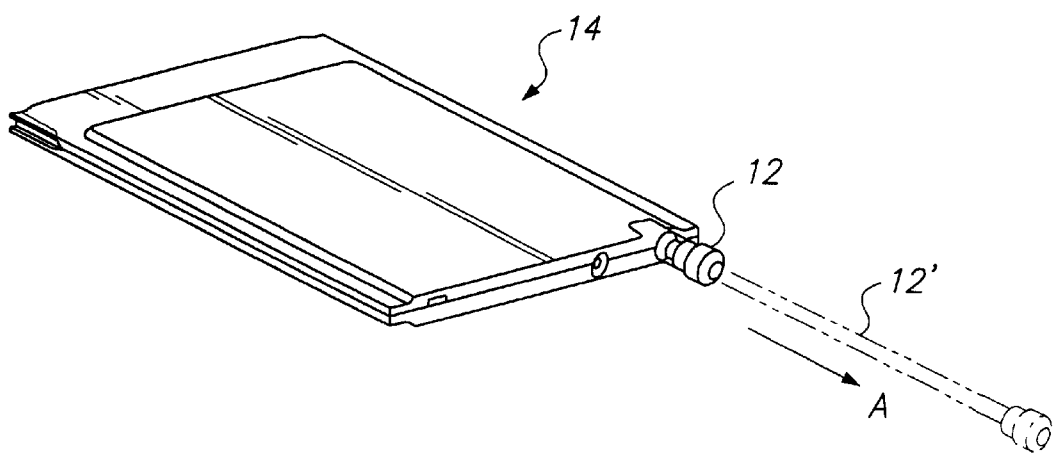
FIG. 2 is a perspective view of the PC card with the antenna shown in a retracted and an extended position.

The antenna 12 as illustrated in FIG. 1 has a retracted position and an extended position. As shown in FIG. 2, the antenna 12 can reciprocally move between the retracted position and the extended position, shown in phantom lines as 12', in a direction of arrow A. In the retracted position, the antenna 12 is substantially received by the PC card 14. In the extended position, the antenna 12' substantially extends beyond the PC card 14.

The overall performance of the antenna is a function of the length of the antenna. If the antenna is extended and then rotated or pushed back into the PC card, the performance of the modem card is compromised. In order to avoid the variable length of the antenna, what is needed is an antenna which locks into place when fully extended providing maximum performance of the PCMCIA card.

Figure 3:
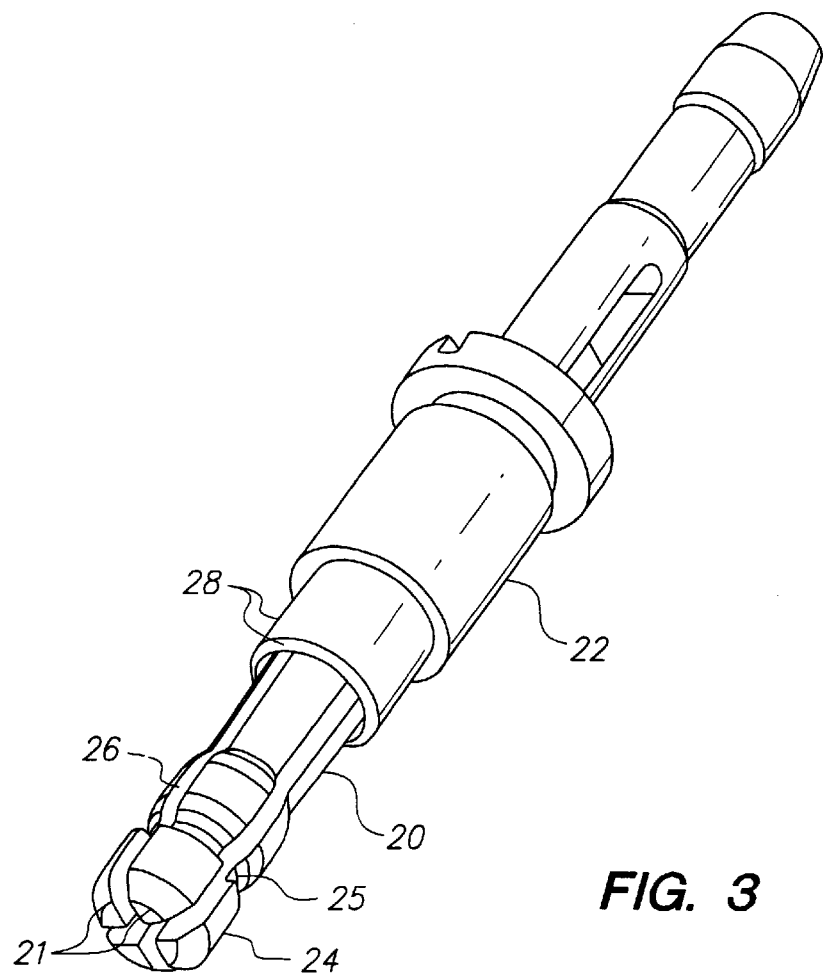
FIG. 3 is a perspective view of a snap lock for the antenna of FIG. 1 illustrating an antenna body and an antenna sleeve with the antenna body in a retracted position.
Figure 4:
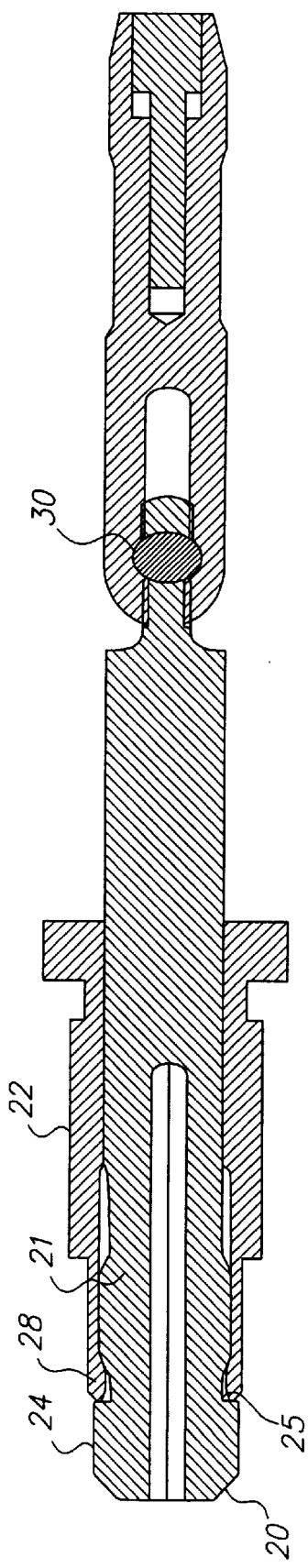
FIG. 4 is a side cross sectional view of the snap lock of FIG. 3 in an extended position showing the antenna body and antenna sleeve in the extended and locked position.

FIGS. 3 and 4 illustrate the antenna 12 including an antenna body 20 having a pivotal connection 30. The antenna body 20 is slidable longitudinally within an antenna sleeve 22. The antenna body 20 has a raised portion 24 on the proximal end with an outer diameter greater than the inside diameter of the antenna sleeve 22. Adjacent the raised portion 24 is an annular recessed portion or locking groove 25. Four axial slots 26 on the antenna body 20 form four fingers 21 and allow the antenna body 20 to be squeezed into the antenna sleeve 22. The antenna sleeve 22 has a neck 28 on the proximal end that is ring shaped with an inner diameter smaller than the inside diameter of a remainder of the sleeve. The neck 28 of the sleeve 22 snaps into a locking groove 25 of the antenna body 20 when the antenna is in the extended and locked position.

FIG. 4 is a cross-sectional view of the antenna body 20 and antenna sleeve 22 in the locked position where the four fingers 21 on the antenna body have been squeezed into the antenna sleeve and the neck 28 is snapped into the locking groove 25.

Figure 5:
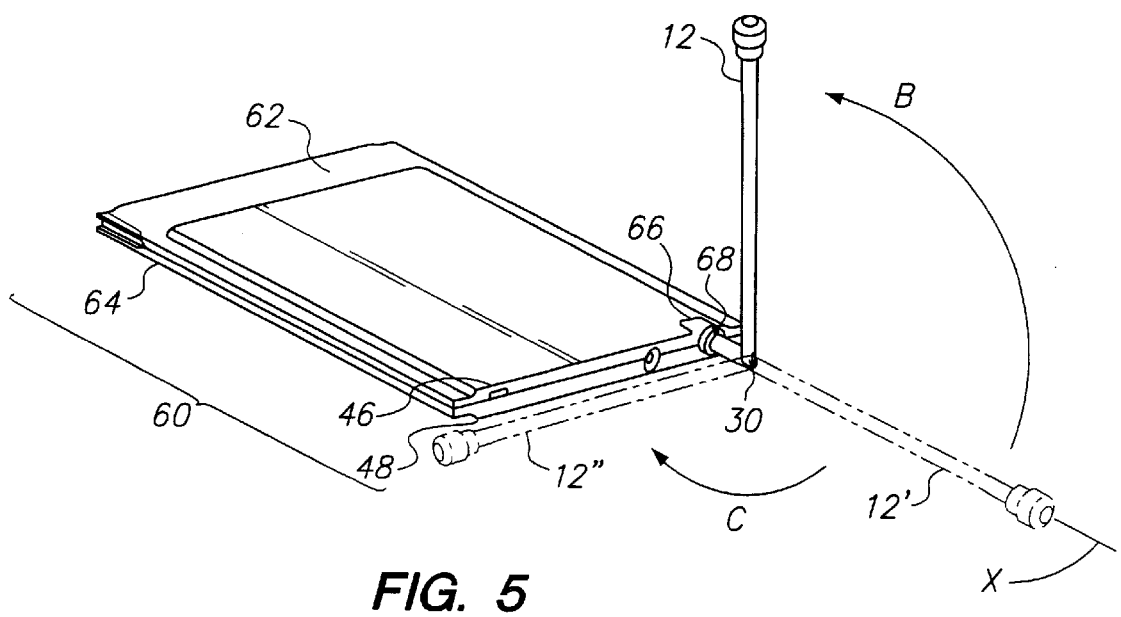
FIG. 5 is a perspective view of the PC card illustrating the rotation of the antenna about the X-axis and about a pivotal connection.

FIG. 5 illustrates one embodiment of the antenna 12, which pivotally rotates about a pivotal connection 30 from the extended position of FIG. 2, shown in phantom lines as 12', to a raised position where the antenna has been moved in a direction of arrow B. The pivotal connection 30 enables a user to adjust the position of the antenna 12 with respect to the PC card 14. The pivotal connection 30 may comprise any suitable means including, but not limited to, a hinge, such as a tongue-in-groove hinge. The pivotal connection 30 allows the antenna 12 to pivot about an axis of the pivotal connection. Moreover, the antenna 12 is rotatable within the sleeve 22, and, therefore, has a rotatable connection for rotating the antenna about an X-axis. Therefore, the antenna 12 can move from the lifted position shown in solid lines to a lowered position, shown in phantom lines as 12", when the antenna is moved in the direction of arrow C. Accordingly, when the antenna 12' is in the extended position, the antenna has multiple axes of rotation. In particular, the antenna 12 can pivot about the pivotal connection 30 and can rotate about the X axis so that the antenna may be moved into the most appropriate position to maximize the effectiveness of use.

In a preferred embodiment, the matching circuit comprises an inductor/capacitor (LC) circuit. The connection of the antenna to the electronics of the PC card will be further described below.

Figure 6:
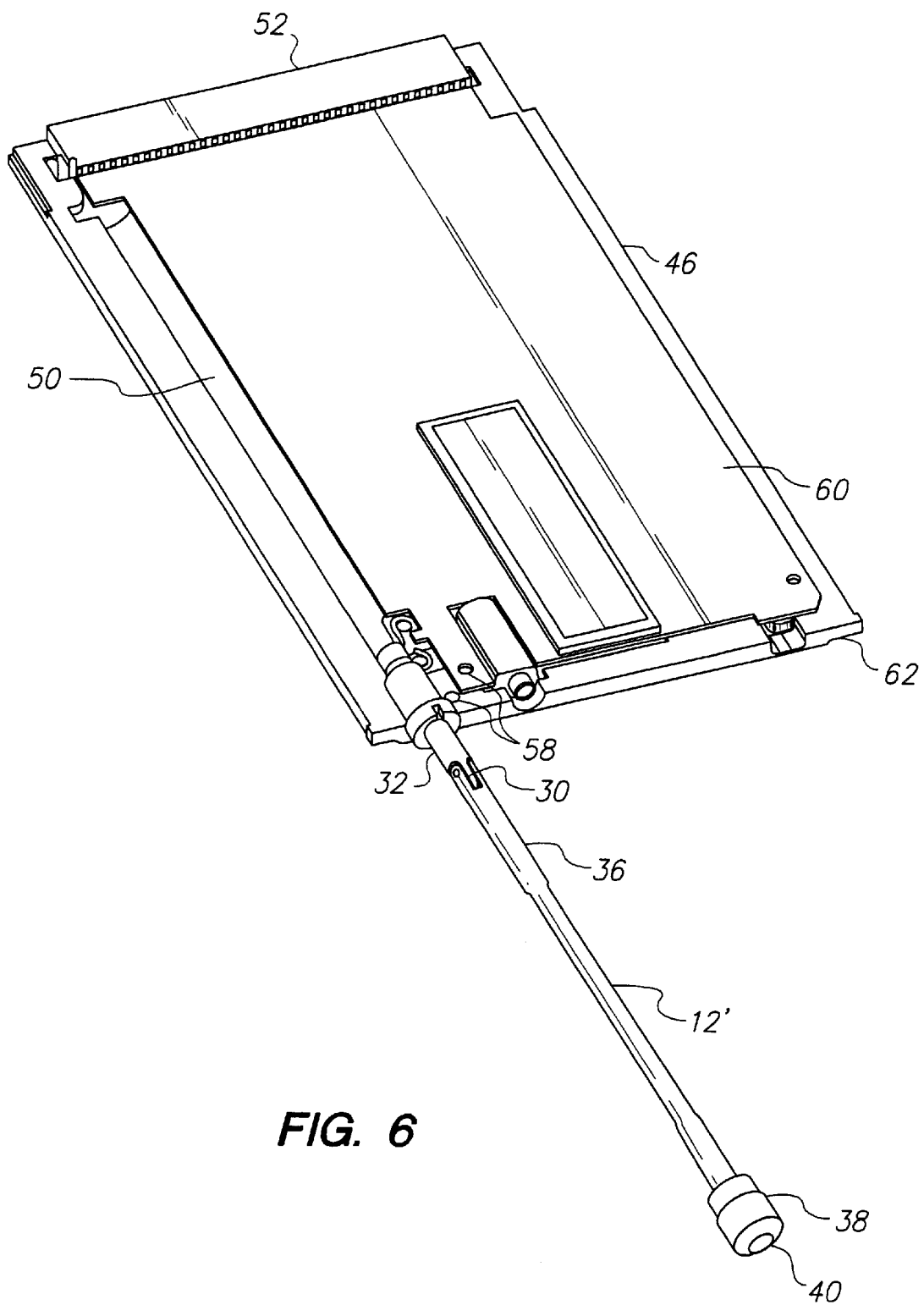
FIG. 6 is a perspective view of an inside surface of a top portion of the PC card with the antenna.
Figure 7:
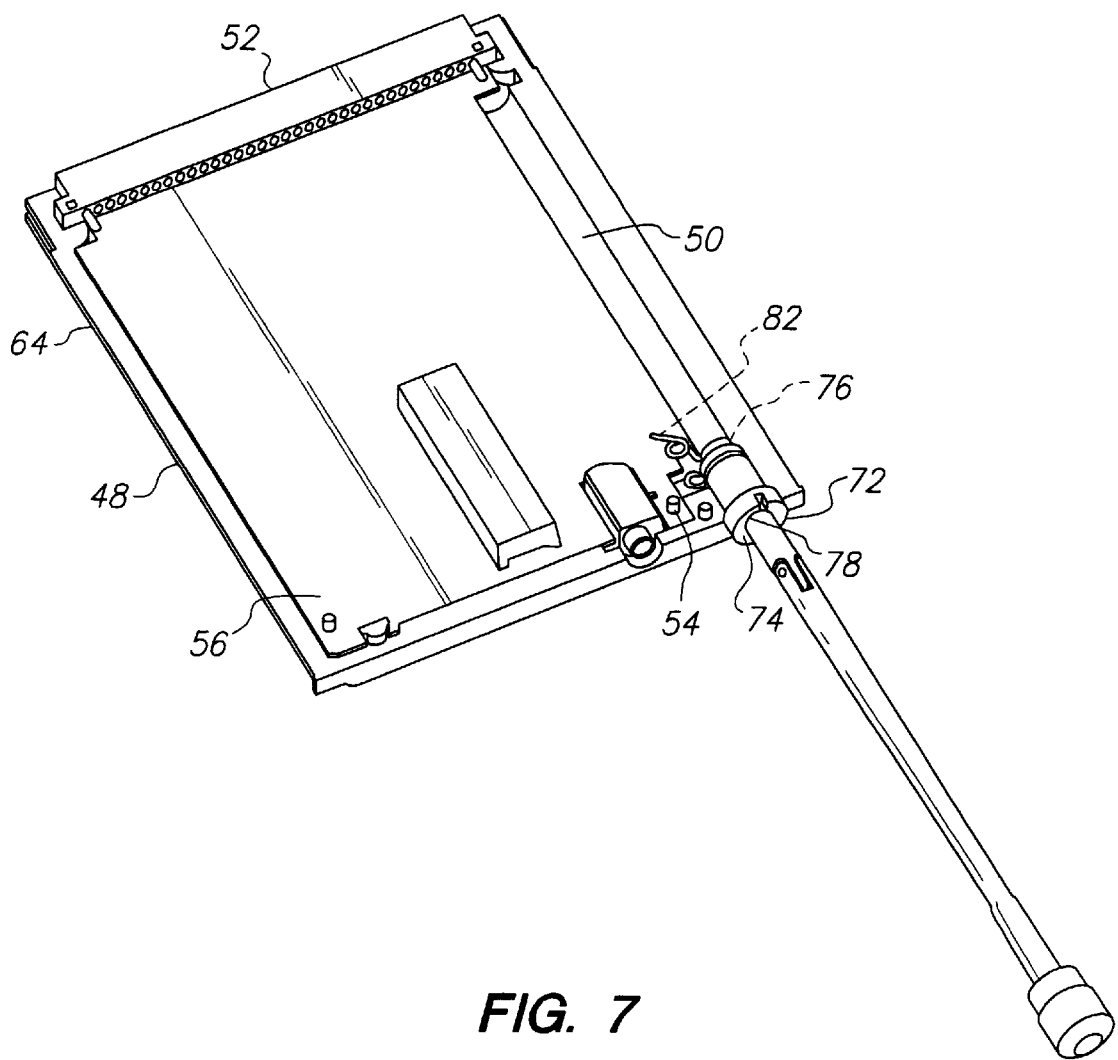
FIG. 7 is a perspective view of an inside surface of a bottom portion of the PC card with the antenna.

FIGS. 5–7 illustrate one embodiment of the PC card 14. In this configuration, the PC card 14 includes a top portion 46, a bottom portion 48 which is attachable to the top portion, electrical components which are entirely enclosed by the top and bottom portions, and channel portions 50 located in the top and bottom portions. Also, shown is a PCMCIA connector 52. FIG. 6 shows the top portion 46 having corresponding openings 58, which receive the alignment pins 54 when the top and bottom portion 46, 48 are attached to form a housing 60 for the PC card 14. FIG. 7 illustrates the bottom portion 48 of the PC card 14 having at least one alignment pin 54 which extends from an inside surface 56 of the bottom portion. (FIG. 7 shows three alignment pins)

Preferably, the top and bottom outside surfaces 62, 64 of the top and bottom portions 46, 48 are substantially coated with a conductive material to provide shielding for the electrical components located inside the PC card 14. The top and bottom portion 46, 48 are preferably otherwise formed of plastic. As best shown in FIG. 7, a cut out portion 76 is provided in the top and bottom outside surfaces 72, 74 adjacent to the sleeve 22, which supports the antenna 12 when the antenna is extended. The cut out portion 76 electrically separates the conductive shielding material and the sleeve 22. In an alternative embodiment, the inside surfaces 56, 60 of the top and bottom portions 46, 48 are coated with a conductive material to provide good shielding for the electrical components located inside the PC card 14.

The passage 78 in the sleeve 22 is configured to slidably receive the antenna 12. Preferably, there is a friction fit between the outer diameter of the antenna portion 32 and the inner diameter of the passage 78 to provide an electrical connection between the antenna 12 and the sleeve 22 and to provide a rotational connection between the antenna and the card. When the antenna 12 is in the extended position, the antenna portion 32 snaps into the sleeve 22. The end cap 38 mounted at the distal end 40 of the antenna portion 36 has an outer diameter larger than the inner diameter of the passage 78 of the sleeve 22. The end cap 38 prevents further insertion of the antenna 12 into the PC card 14 beyond a predetermined distance. Moreover, the end cap 38 provides a means for the user to grasp and reciprocally move the antenna 12 between the retracted position and the extended position.

A conductive member 82 is provided in the PC card 14 adjacent to the sleeve 22. The conductive member 82 is connected to electrical components enclosed in the PC card 14. The conductive member 82 may comprise any suitable means including, but not limited to, a torsion spring, a leaf spring, or a cantilever member.

In operation, the device functions to receive and transmit electrical signals to and from the PC card 14. When the antenna 12 is in the retracted position, the channel portions 50 of the PC card 14 substantially receive the antenna. Further, the antenna portion 36, covered or wrapped with a nonconductive material, is adjacent to the sleeve 22. The antenna 12 does not have electrical connection with the antenna sleeve 22 when in the retracted position. By slidably moving the antenna 12 from the retracted position to the extended position, the antenna portion 32, formed of a conductive material, contacts the sleeve 22, wherein a signal can be transmitted from electrical components enclosed in the PC card 14 through the conductive member 82 to the sleeve 22 and then to the antenna 12. As discussed, the antenna 12 can pivot about the pivotal connection 30 and can rotate about the X-axis so that the antenna may be moved into the most appropriate position to maximize the effectiveness of use.

The length of the antenna in the locked and fully extended position is a function of the PCMCIA card's operating frequency. The operating frequency of a PCMCIA card is the number of cycles in which a radio wave is transmitted and received. The frequency is measured in hertz. One hertz is equal to one cycle per second. The relationship between a radio signal's frequency and its wavelength in meters is calculated using the formula:

Wavelength (m)=300/frequency

In one embodiment the PCMCIA card will transmit and receive a radio signal in the 1850 to 1990 megahertz ranges. As such, the length of the antenna in one embodiment would be one half of a wavelength based on the operating frequency calculated in wavelengths or 0.08 to 0.075 meters. If the frequency of the PCMCIA card is 800 to 900 megahertz, the length of the antenna is 0.375 to 0.333 meters. Thus, in a preferred embodiment, the length of the antenna will be a fraction of a wavelength which maximizes performance of the antenna.

The antenna preferably can be extended or retracted between the locked and unlocked position with a force of between 250 and 850 grams. In other words, a force of at least 250 grams is required to disengage the snap lock provided by the neck 28 and the locking groove 25.

The locking retractable antenna for use with a PCMCIA card is designed to lock into place when the antenna 12 is fully extended maximizing the receiving and transmitting capability of the modem. Furthermore, in the retracted position the antenna 12 is substantially received by the PCMCIA card.

The PC card 14 shown in the figures is a PCMCIA Type II card, but it is within the scope of the invention to use a PCMCIA Type I or Type III card, as well. Likewise, it is within the scope of the invention that the PC card 14 can be any of a variety of removable cards that are not restricted to the PCMCIA standard specifications.

While the invention has been described in detail with reference to the preferred embodiments thereof, it will be apparent to one skilled in the art that various changes and modifications can be made and equivalents employed without departing from the present invention.

What is claimed is:

1. A device for providing wireless communication, the device comprising:
   a PC card;
   a modem within the PC card;
   a retractable antenna connected to the modem, the retractable antenna having an extended transmitting/receiving position and a retracted position with respect to the PC card;

a locking mechanism for providing a lock to maintain the antenna in the extended position during ordinary use and retraction of the antenna when not in use; and wherein the locking mechanism is a snap lock.

2. The device for providing wireless communication of claim 1, wherein the locking mechanism includes an antenna body which has a raised portion on a proximal end with a diameter greater than the inside diameter of an antenna sleeve.

3. The device for providing wireless communication of claim 2, wherein the antenna body has four slots, and the antenna is squeezed into the antenna sleeve.

4. The device for providing wireless communication according to claim 2, wherein the antenna sleeve has a neck on the proximal end that is ring shaped with a diameter smaller than the inside diameter of the sleeve.

5. The device for providing wireless communication of claim 1, wherein the locking mechanism includes a sleeve and a portion of the antenna slidable axially within the sleeve.

6. The device for providing wireless communication of claim 5, wherein the sleeve and the portion of antenna include interengaging snap locking elements.

7. The device for providing wireless communication of claim 1, wherein the retractable antenna has a pivotal connection for pivoting a portion of the antenna about the pivot connection and a rotational connection for rotating the antenna about a first axis.

8. The device for providing wireless communication of claim 7, wherein the length of the antenna is measured from the pivot connection to an end cap of the antenna.

9. The device for providing wireless communication of claim 1, wherein the retractable antenna substantially extends beyond the PC card and the antenna is electrically connected to the PC card.

10. The device for providing wireless communication of claim 1, wherein a spring located inside of the PC card and is in electrical contact with the antenna.

11. The device for providing wireless communication of claim 10, wherein the spring provides an electrical connection between the PC card and the antenna when antenna is extended a distance beyond the PC card.

12. The device for providing wireless communication of claim 1, wherein a length of the antenna is a function of the operating frequency of the antenna in the extended position.

13. The device for providing wireless communication of claim 1, wherein the length of the antenna is one half of a wavelength based the operating frequency of the antenna in the extended position.

14. The device for providing wireless communication of claim 1, wherein the PC card will transmit and receive radio signals in the 1850 to 1990 megahertz ranges.

15. The device for providing wireless communication of claim 1, wherein the antenna can be extended by about 250 grams to 850 grams of force.

16. The device for providing wireless communication of claim 1, wherein the antenna can be retracted by about 250 grams to 850 grams of force.

17. The device for providing wireless communication of claim 1, wherein the antenna has a locking groove which locks the antenna in the extended position.

18. The device for providing wireless communication of claim 1, wherein the locking mechanism provides a locking force in both extending and retracting directions.

19. A retractable antenna for a PC card for use in wireless communication, the antenna comprising:

an antenna sleeve electrically connectable to the PC card;

a retractable antenna positioned within the antenna sleeve and slidable within the antenna sleeve from an extended transmitting/receiving position to a retracted storage position; and a locking mechanism provided between the antenna sleeve and the retractable antenna for locking the antenna in the extended transmitting/receiving position to achieve a predetermined transmitting/receiving antenna length; and wherein the locking mechanism is a snap lock.

20. The retractable antenna for a PC card for use in wireless communication according to claim 19, wherein the retractable antenna is rotatable in the sleeve.

21. The retractable antenna for a PC card for use in wireless communication according to claim 20, wherein the retractable antenna includes a pivotal connection for pivoting a first portion of the antenna with respect to a second portion of the antenna.

22. The retractable antenna for a PC card for use in wireless communication according to claim 21, wherein the retractable antenna is electrically connected to the antenna sleeve in the extended transmitting/receiving position and is electrically isolated from the sleeve in the retracted position.

23. The device for providing wireless communication of claim 19, wherein the antenna has a locking groove which locks the antenna in the extended position.

24. The retractable antenna for a PC card for use in wireless communication of claim 19, wherein the locking mechanism provides a locking force in both extending and retracting directions.

25. A device for providing wireless communication, the device comprising:

a PC card;

a modem within the PC card;

a retractable antenna connected to the modem, the retractable antenna having an extended transmitting/receiving position and a retracted position with respect to the PC card; and a locking mechanism for providing a lock to maintain the antenna in the extended position during ordinary use and retraction of the antenna when not in use, wherein the antenna snaps into a sleeve for receiving the antenna in the extended position and is rotatable in the extended position.

26. The device for providing wireless communication of claim 25, wherein the locking mechanism is a snap lock.

27. The device for providing wireless communication of claim 25, wherein the antenna has a locking groove which locks the antenna in the extended position.

28. The device for providing wireless communication of claim 25, wherein the locking mechanism provides a locking force in both extending and retracting directions.

29. A retractable antenna for a PC card for use in wireless communication, the antenna comprising:

an antenna sleeve electrically connected to the PC card;

a retractable antenna positioned within the antenna sleeve and slidable within the antenna sleeve from an extended transmitting/receiving position to a retracted storage position; and a locking mechanism provided between the antenna sleeve and the retractable antenna for locking the antenna in the extended transmitting/receiving position to achieve a predetermined transmitting/receiving length, wherein the retractable antenna snaps into the sleeve in the extended position.

30. The retractable antenna for a PC card for use in wireless communication of claim 29, wherein the retractable antenna is rotatable in the sleeve in the extended position.

31. The retractable antenna for a PC card for use in wireless communication of claim 29, wherein the retractable antenna includes a pivotal connection for pivoting a first portion of the antenna with respect to a second portion of the antenna.

32. The retractable antenna for a PC card for use in wireless communication of claim 29, wherein the retractable antenna is electrically connected to the antenna sleeve in the extended transmitting/receiving position and is electrically isolated from the sleeve in the retracted position.

33. The retractable antenna for a PC card for use in wireless communication of claim 29, wherein the locking mechanism provides a locking force in both extending and retracting directions.

* * * * *